July 6, 1943.  G. A. TINNERMAN  2,323,689

FASTENING DEVICE

Filed March 24, 1939

INVENTOR.
GEORGE A. TINNERMAN
BY Bates, Dolrick, & Teare
ATTORNEYS

Patented July 6, 1943

2,323,689

UNITED STATES PATENT OFFICE 2,323,689

FASTENING DEVICE

George A. Tinnerman, Rocky River, Ohio, assignor, by mesne assignments, to Tinnerman Products, Inc., Cleveland, Ohio, a corporation of Ohio Application March 24, 1939, Serial No. 263,874

2 Claims. (Cl. 85—36)

This invention relates to fasteners and particularly to those which are made of sheet metal and that are adapted for use in holding two or more articles together. The invention is useful in connection with a fastener that is intended for use in a blind location, that is, where an operator cannot readily hold a nut while he is inserting a bolt into it. Heretofore, reliance has been placed upon extraneous means, such as rivets or other kindred devices for holding the fastener in place, but there are many instances, particularly in automotive assembly, where sheet metal fasteners are desirable in blind locations, but where it is impractical to hold them in a satisfactory manner by means of extraneous devices.

An object of the present invention therefore is to make a sheet metal fastener in such manner that when it is applied to a part having a bolt receiving aperture in a blind location it will automatically hold itself in bolt receiving position on the part, thereby enabling the bolt to be inserted without requiring the operator to hold the fastener while the bolt is being threaded into it. An additional object is to make a sheet metal fastener which will operate to hold an article other than a bolt and which will be retained automatically in article receiving position upon a support.

Figure 1:
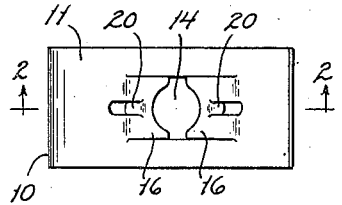
Figure 2:
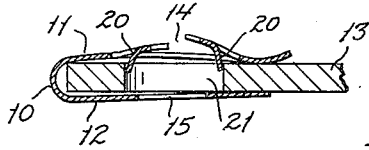
Figure 3:
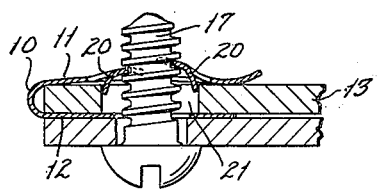
Figure 4:
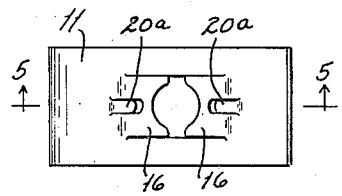
Figure 6:
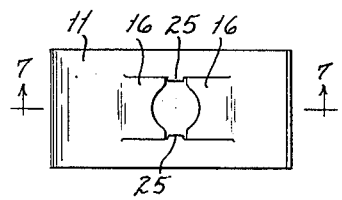
Figure 7:
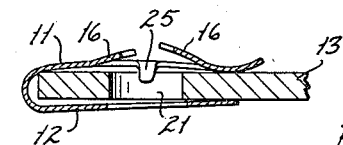

Referring now to the drawing, Fig 1 is a top plan view of a fastener embodying one form of the invention; Fig. 2 is a section taken on the plane indicated by the line 2—2 in Fig. 1, and Fig. 3 is a section similar to Fig. 2 but showing the two parts to be fastened in assembled relation with a bolt; Fig. 4 is a plan and Fig. 5 a cross section on the line 5—5 of Fig. 4, illustrating a fastener not having the spring action to the positioning lugs inherent in Figs. 1, 2 and 3; Figs. 6 and 7 are respectively a plan and a cross section on the line 7—7 in Fig. 6, illustrating a fastener covered in my divisional application No. 466,734 filed November 24, 1942.

Referring first to Fig. 1, the fastener is shown as a strip of sheet metal which is bent inwardly at 10 to provide two arms, one of which is indicated at 11 and the other at 12. The arms may be spaced apart a distance that corresponds to the thickness of the part or support 13 on which the fastener is intended for use. Additionally, the arm 11 may have an aperture 14 therein for receiving the shank of a bolt or similar device while the arm 12 may have an aperture 15 in registration with the opening 14 and through which the shank of a fastener 17 (Fig. 3) may extend. The opening 15 is adapted to clear the shank of the bolt but that part of the arm adjacent the opening 14 has a thread follower associated therewith. I am not concerned in this application with the particular shape or configuration of the thread follower but for the purpose of illustration, I have shown it as comprising tongues 16 which are formed integrally with the arm 11 and which extend out of the plane thereof. The thickness of the metal of which the fastener is formed is preferably uniform throughout its length and is less than the pitch of the thread on a bolt with which it is intended to be used. Accordingly, the tongues 16 are deformed to correspond to the helix of the bolt thread and fit snugly within the thread, as shown in Fig. 3, and engage one turn thereof.

To position the fastener on a part, I have shown in Figs. 1, 2 and 3, article engaging means which take the form of projections 20 which are disposed near the bolt opening 14 and which are adapted to engage the article 13, and preferably the wall of the opening 21 in the part 13. While I have illustrated two projections 20, I may, if desired, use only one projection for accomplishing the desired purpose. In this form of construction, the projections 20 are attached integrally to the tongues 16 near the thread engaging portions and the free ends extend downwardly as shown in Figs. 2 and 3.

Figure 5:
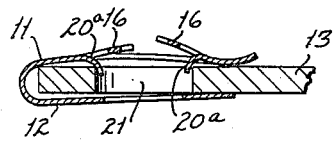

The fastener shown in Figs. 4 and 5 in the formation of the body, is similar to the fastener previously described, so that the same reference characters are employed where they apply, but in the latter case the projections 20a, while cut out of the tongues, are attached directly to the base and not to the tongues themselves, as previously described, the projections facing in the opposite direction from those of Figs. 1, 2 and 3. These latter projections, therefore, lack the spring action consequent upon the projections being carried by the tongues themselves.

The modification of Figs 6 and 7 also has a fastener which has the general configuration of that shown in Fig. 1, except for the fact that the article engaging portions 25 are formed from the bridge portions of the base adjacent the bolt opening 14, instead of from the tongues 16.

A fastener made in accordance with my invention is advantageous in that the article engaging portion is formed from the same arm which has the thread engaging portion or article engaging portion therein. This simplifies the construction without unduly weakening the holding power of the fastener.

I claim:

1. A fastener comprising a strip of sheet material doubled on itself to provide two spaced arms adapted to embrace a support, one of the arms having a pair of opposed inclined spring tongues severed at their sides from the arm and free at their adjacent ends but attached integrally to the arm at their distant ends, and a projection carried by one of said inclined tongues and extending downwardly so that it may pass into an opening in the support, whereby the spring action of the tongue carrying the projection is applicable also to the projection, enabling the ready mounting of the device.

2. A fastener comprising a strip of spring sheet metal doubled on itself to provide two arms spaced apart so that a support may be mounted between them, one of the arms having a pair of opposed inclined tongues severed at their sides from the arm and spaced at their adjacent ends but attached integrally to the arm at their distant ends, the ends of the tongues being formed for engagement with the thread of a bolt passing through the other arm and through an opening in the support, and projections cut out of the inclined tongues and bent therefrom to extend into the opening in the support, whereby the spring action of the tongues carrying the projections is applicable also to the projections.

GEORGE A. TINNERMAN.